United States Patent
Pursifull et al.

(10) Patent No.: US 8,245,691 B2
(45) Date of Patent: Aug. 21, 2012

(54) ENGINE AND EXHAUST HEATING

(75) Inventors: Ross Dykstra Pursifull, Dearborn, MI (US); Gopichandra Surnilla, West Bloomfield, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/399,670

(22) Filed: Feb. 17, 2012

(65) Prior Publication Data
US 2012/0145124 A1 Jun. 14, 2012

Related U.S. Application Data

(63) Continuation of application No. 13/149,410, filed on May 31, 2011, now Pat. No. 8,118,008, and a continuation of application No. 12/266,091, filed on Nov. 6, 2008, now Pat. No. 7,950,368.

(51) Int. Cl.
*F02P 5/00* (2006.01)
*F02P 5/02* (2006.01)

(52) U.S. Cl. ............................... 123/406.24; 123/406.23

(58) Field of Classification Search ............. 123/406.21, 123/406.22, 406.23, 406.24, 406.35, 406.55, 123/406.59, 406.7, 406.76; 701/105, 113
See application file for complete search history.

(56) References Cited

U.S. PATENT DOCUMENTS

| | | |
|---|---|---|
| 4,068,633 A | 1/1978 | Kawai et al. |
| 4,268,910 A | 5/1981 | Omori et al. |
| 4,745,901 A | 5/1988 | Reifenberger et al. |
| 5,483,946 A | 1/1996 | Hamburg et al. |
| 5,588,409 A | 12/1996 | Mizuno et al. |
| 5,740,045 A * | 4/1998 | Livshiz et al. ................ 701/101 |
| 5,884,605 A | 3/1999 | Nagaishi et al. |
| 5,950,419 A | 9/1999 | Nishimura et al. |
| 6,085,723 A | 7/2000 | Pels et al. |
| 6,109,237 A | 8/2000 | Pels et al. |
| 6,212,879 B1 | 4/2001 | Nishimura et al. |
| 6,334,431 B1 | 1/2002 | Kanehiro et al. |
| 6,615,785 B2 | 9/2003 | Weiss |
| 6,644,274 B2 | 11/2003 | Hasegawa et al. |
| 6,655,339 B1 | 12/2003 | Orr |
| 6,694,959 B1 | 2/2004 | Miwa et al. |
| 6,834,638 B2 | 12/2004 | Lee |
| 7,021,281 B2 | 4/2006 | Ruiz |
| 7,159,566 B2 | 1/2007 | Tomita et al. |
| 7,305,965 B2 | 12/2007 | Zillmer et al. |
| 7,762,232 B2 | 7/2010 | Pursifull et al. |
| 7,840,337 B2 | 11/2010 | Zillmer et al. |
| 7,997,252 B2 | 8/2011 | Pursifull et al. |
| 2003/0168041 A1 | 9/2003 | Kubo |
| 2004/0055283 A1 | 3/2004 | Iihoshi et al. |

(Continued)

FOREIGN PATENT DOCUMENTS

JP 2004027998 A 1/2004

(Continued)

*Primary Examiner* — Mahmoud Gimie
(74) *Attorney, Agent, or Firm* — Julia Voutyras; Alleman Hall McCoy Russell & Tuttle LLP (57) ABSTRACT

A method for controlling a vehicle engine having a plurality of cylinders is provided. The method comprises: during engine idling, advancing spark timing of at least one cylinder to before a peak torque timing, and retarding spark timing from the advanced timing toward the peak torque timing in response to decreased engine speed to maintain idling speed.

9 Claims, 7 Drawing Sheets

U.S. PATENT DOCUMENTS

| | | |
|---|---|---|
| 2005/0045118 A1* | 3/2005 | Wakao et al. .................. 123/3 |
| 2009/0064966 A1* | 3/2009 | Nakasaka .................. 123/339.11 |
| 2010/0108032 A1 | 5/2010 | Pursifull et al. |
| 2011/0288713 A1 | 11/2011 | Pursifull et al. |

FOREIGN PATENT DOCUMENTS

| | | |
|---|---|---|
| JP | 2005299567 A | 10/2005 |
| WO | 2006123836 A1 | 11/2006 |

* cited by examiner

ENGINE AND EXHAUST HEATING

CROSS REFERENCE TO RELATED APPLICATIONS

The present application is a continuation of U.S. patent application Ser. No. 13/149,410 filed May 31, 2011, which is a continuation of U.S. patent application Ser. No. 12/266,091, filed Nov. 6, 2008, now U.S. Pat. No. 7,950,368, the entire contents of which are incorporated herein by reference for all purposes.

FIELD

The present application relates to a system for controlling idle engine speed control after a cold start.

BACKGROUND AND SUMMARY

An engine of a vehicle can operate in an idle condition during stationary or other related vehicle conditions. During cold start engine idle conditions, various systems may utilize waste engine heat to hasten engine warm-up, thereby enabling improved emission performance, engine efficiency, etc. As one example, waste exhaust heat may be adjusted to more rapidly increase catalyst temperature, thereby reducing emissions. Likewise, waste heat in the engine cooling system and/or lubricating system may be directed to the cabin for cabin heating or to the lubricating system, thereby reducing lubricant viscosity thus reducing friction. For example, spark timing may be retarded from MBT during initial starts to first heat an exhaust catalyst, and then once the catalyst is heated, spark timing may be advanced to before MBT to more rapidly heat engine coolant and/or lubricants to thereby provide increased engine efficiency.

One approach for adjusting engine operation during cold starting conditions is described in U.S. Pat. No. 6,334,431, which describes a method for utilizing spark timing advance past minimum spark advance for best torque (MBT) timing when the engine is under cold start conditions and after catalyst light-off to heat engine coolant. The advance value is based on engine coolant temperature, intake air temperature, engine speed, and manifold absolute pressure. Specifically, at engine speeds between 2000-2500 RPM, the spark timing advance is decreased as engine speed increases, and vice versa. Further, below 2000 RPM, the spark timing is independent of engine speed.

The inventors herein have recognized problems with the above approaches. As one example, at idling conditions when heating the engine coolant via advance timing past MBT, idle speed control may degrade. In particular, if spark timing is further advanced from an advanced timing relative to MBT in response to speed drops, the potential for engine stalls may increase. In other words, as spark timing is further advanced past MBT, engine torque decreases. If engine torque decreases too rapidly while the engine is decelerating or while entering idle conditions, the engine may stall.

The above issues are addressed by a method for controlling a vehicle engine having a plurality of cylinder, the method comprising: during engine idling, advancing spark timing of at least one cylinder to before a peak torque timing, and retarding spark timing from the advanced timing toward the peak torque timing in response to decreased engine speed to maintain idling speed.

By taking advantage of the torque reserve generated by the advanced spark timing used for increasing heat to engine coolant and/or lubricant, it is possible to improve idle speed control under such conditions. For example, by retarding spark timing in response to a drop in engine speed (while remaining advanced relative to MBT), it is possible to provide a rapid increase in engine torque, with only minor and likely temporary effects on heat delivered to the engine coolant and/or lubricant. As such, improved idle engine speed control can be achieved with reduced stalls while warming the engine. For example, the above approach can provide quick-acting torque reserve with the option of directing waste engine heat to the exhaust or the engine coolant, respectively. In this example, the directional choice of waste heat delivery can be achieved without impacting the level of torque and while maintaining torque reserve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
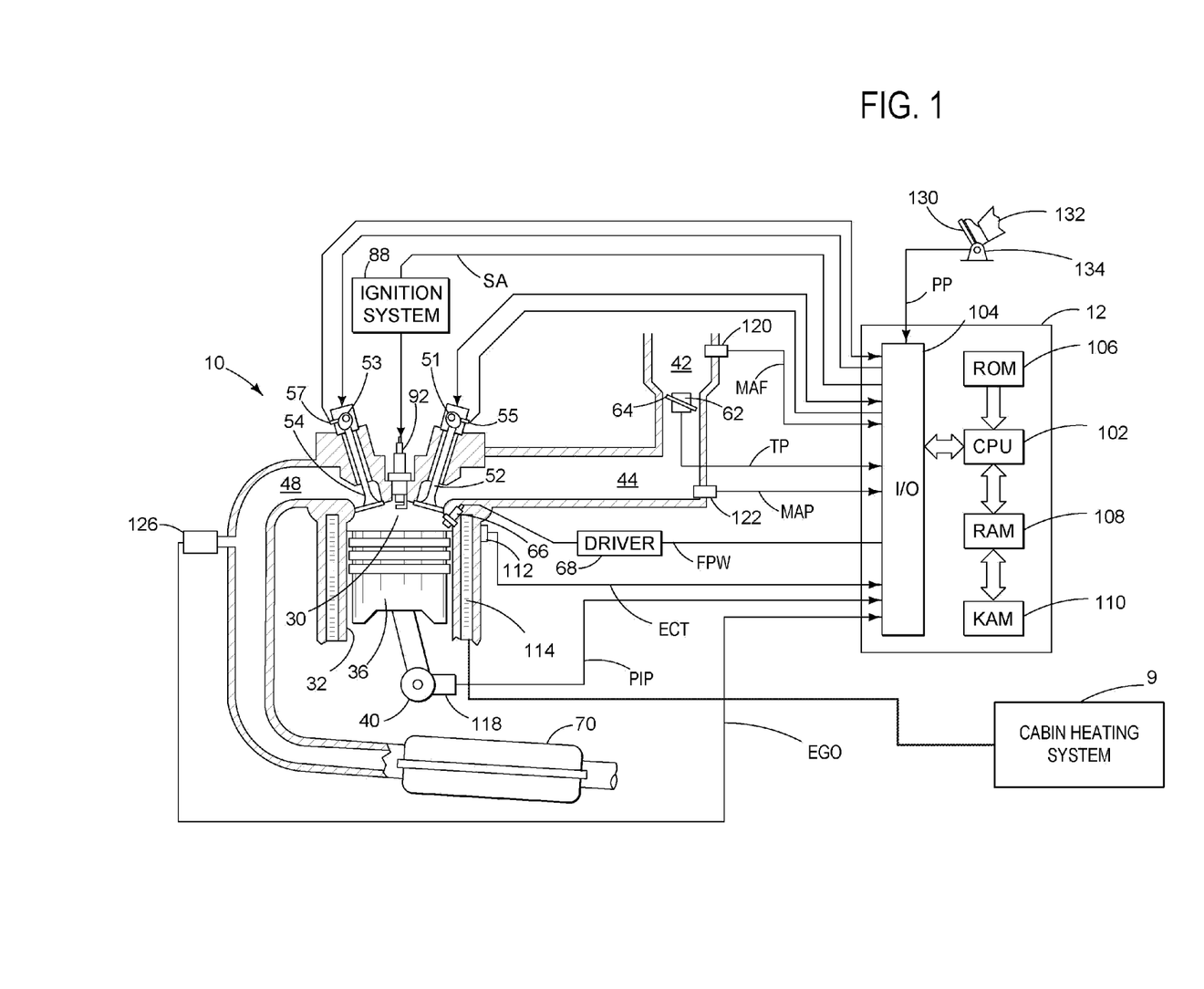
FIG. 1 shows an example of a direct injection engine with cam actuation systems.

FIG. 1 is a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 is coupled to the cabin heating system 9.

As described above, FIG. 1 shows only one cylinder of a multi-cylinder engine, and each cylinder may similarly include its own set of intake/exhaust valves, fuel injector, spark plug, etc.

Figure 2:
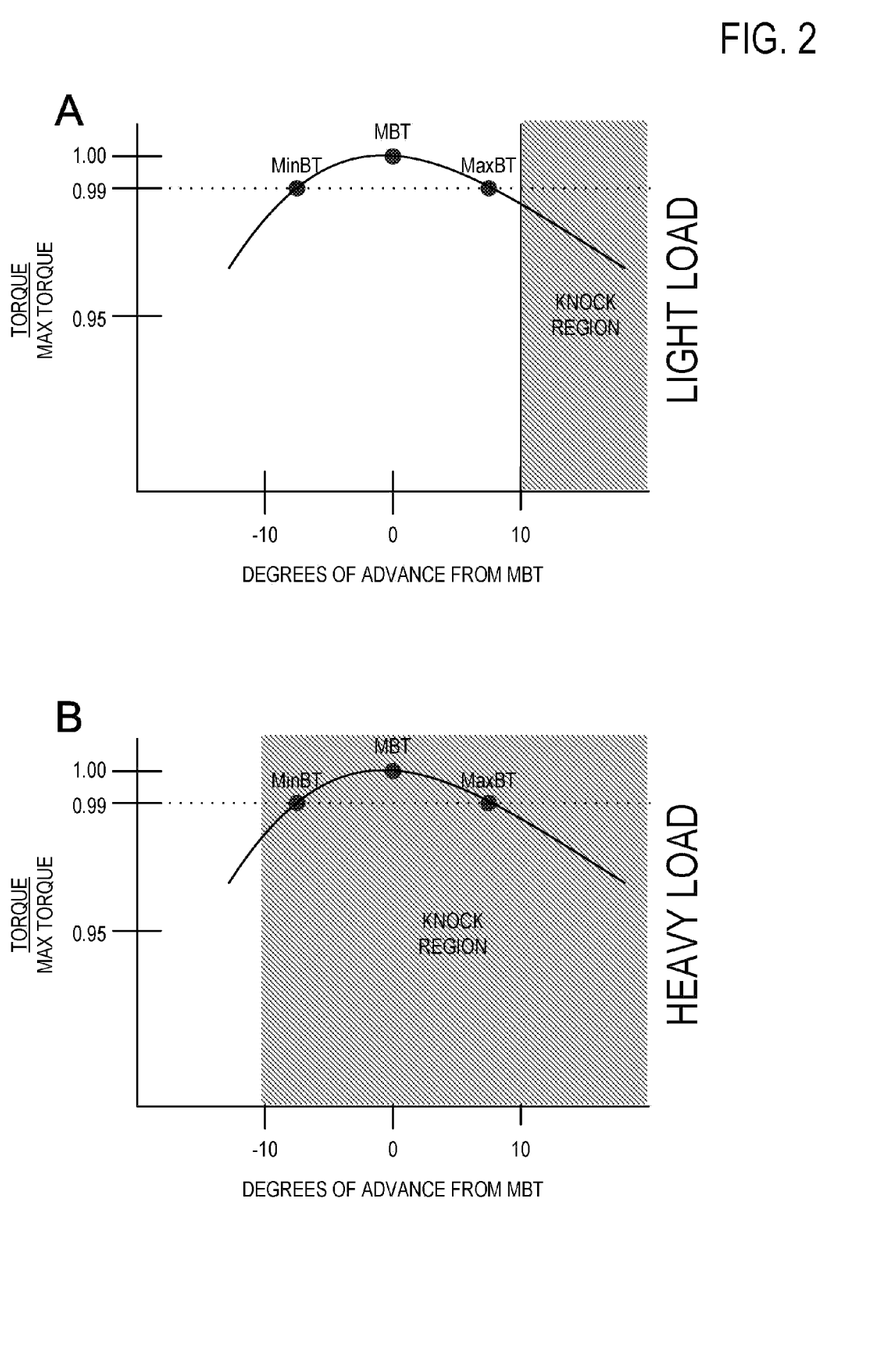
FIGS. 2A and 2B show movement of the knock limit region as a function of engine load.

Referring now to FIGS. 2A and 2B, these graphs illustrate example knock constraints at low and high engine loads, respectively. Each graph shows generally how, for a given fuel and air amount in the cylinder, spark timing affects scaled engine output torque (engine torque over the peak engine torque). Specifically, it shows an example peak torque timing (MBT), with retarded timings relative to MBT on the left, and advanced timings relative to MBT on the right of MBT. Further, the graph illustrates a range of peak torque timings (MinBT to MaxBT).

As illustrated, engine knock may constrain available spark timing to a greater extent as engine load increases, especially with respect to advanced timing past MBT. For example, FIG. 2A shows the knock constraint only at spark timings advanced past approximately 10 degrees of advance past MBT, whereas FIG. 2B shows the knock constraint even at 10 degrees retarded from MBT.

FIGS. 2A to 2B illustrate that during light loads, knock constraints may enable operation at an advanced timing past MBT, at least under some conditions. Light loads may comprise a majority of idling operation, at least after the initial catalyst warm-up operation, and therefore may be operated with spark timing advanced past MBT. As such, in various examples described herein, such operation may be used to increase heat to the engine coolant and/or engine lubricants to improve performance.

Referring now to FIGS. 3-6, various flowcharts describe example operations of idle speed control. Specifically, during idle conditions, the engine is adjusted to maintain a minimum engine speed even if the operator is not requesting engine output. For example, an engine control system may adjust engine airflow and/or spark timing to maintain idling operation and compensate for disturbances such as actuation of the steering system, engagement of a climate control air conditioning (A/C) compressor, etc. In engine idle speed control, the control system may retain a torque reserve, in which it is possible to rapidly increase engine output to maintain engine idle speed and compensate for disturbances such as those noted above, via spark timing adjustments.

One mode for maintaining sufficient torque reserve during idling conditions of the spark ignition engine includes nominally operating at retarded spark timing relative to MBT timing. Such an approach can also coordinate with cold starting conditions, in which retarded spark timing is provided to increase exhaust heat provided to an exhaust emission control device (e.g., catalyst 70) to improve its light-off performance. In this example, the spark timing may be adjusted responsive to engine speed feedback to enable rapid increases or decreases in engine torque to maintain accurate idle speed control, while also substantially maintaining increased exhaust heat to the catalyst. Specifically, spark timing may be advanced relative to the nominal spark timing to enable a rapid increase in engine torque.

However, once the catalyst has reached light-off temperature, for example, a second mode may be used in which the engine nominally operates at an advanced timing relative to MBT to increase heat rejected to engine coolant and/or lubricants, and quicker reduction of combustion chamber heat loss as compared to retarded spark timing relative to MBT. Here, the spark timing can also be adjusted responsive to engine speed feedback to enable rapid increases or decreases in engine torque to maintain accurate idle engine speed control, while providing excess heat to the cabin at zero fuel cost. However, when operating in this mode, the spark timing can be retarded with respect to the nominal spark timing to enable a rapid increase in engine speed. For example, if there is a torque disturbance that reduces engine speed, spark timing can be retarded to increase engine torque and counteract the reduced speed, thereby reducing the likelihood of stalling.

By operating advanced of the peak torque timing, a sufficient torque reserve is maintained for idle speed control while also increasing cabin heating performance.

After delivering sufficient heat to the engine coolant and/or lubricant (e.g., once a desired engine coolant temperature is achieved), the engine may be operated in a third idle mode. In this third mode, spark timing is retarded relative to the peak torque timing so that a sufficient torque reserve is maintained, but with less overall spark retard from MBT as compared with the first mode. For example, the magnitude of retard relative to the peak torque timing may be substantially less than that of the first mode so that higher efficiency of the engine is achieved (e.g., torque output over max torque output).

During idle speed control, transitioning between the above-mentioned modes involves maintaining the engine torque during the transition; thereafter, the desired spark timing associated with each mode (e.g., determined by desired catalyst temperature, desired engine coolant temperature, maintaining engine coolant temperature with sufficient torque reserve, etc.) may be gradually reached by concurrently adjusting spark timing for the cylinder(s) selected for adjustment and overall airflow (e.g., via adjustment of throttle 62).

Further, the number of cylinders operating with advanced, or retarded, spark timing relative to MBT may be adjusted to one, some, or all of the engine cylinders depending on operating conditions. For example, during the first and third modes, all of the cylinders of the engine may be operated with nominally retarded spark timing, with the timing of all of the cylinders adjusted responsive to idle speed control deviations. However, during the second mode, only a subset of the engine cylinders may be operated with spark timing nominally advanced (and adjusted responsive to idle speed control deviations), with remaining cylinders operated with spark timing at MBT (and not adjusted responsive to idle speed).

Figure 3:
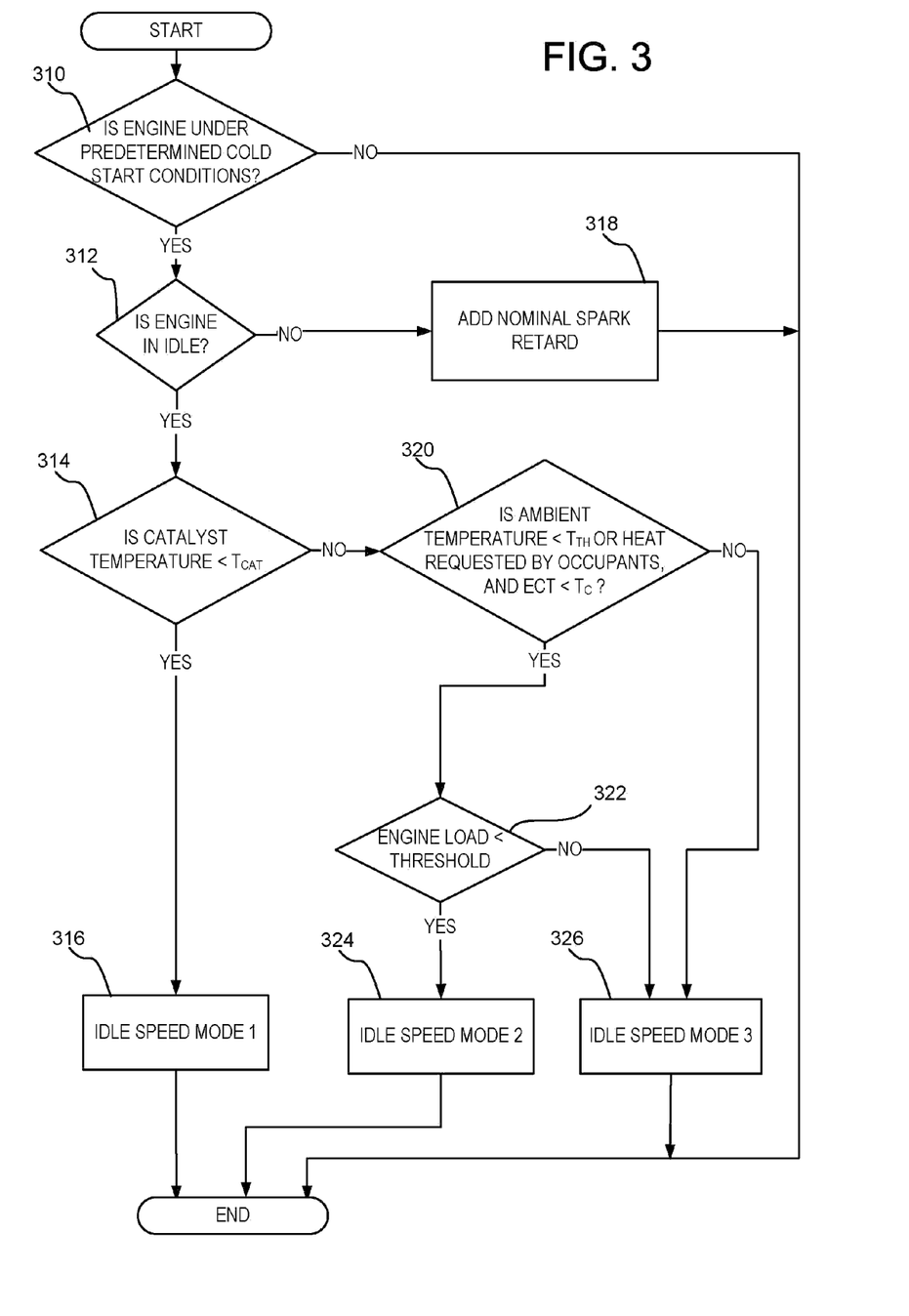
FIG. 3 is a flowchart for selecting an idle speed control mode.

FIG. 3 illustrates determination of an idle speed control mode. If it is determined that the engine 10 is under cold start conditions (e.g., engine coolant temperature is approximately equivalent to ambient temperature) at 310 and the engine is in idle at 312, the routine proceeds to 314 where catalyst temperature is compared to a prescribed threshold $T_{CAT}$, which may be associated with a catalyst light-off temperature. Idle conditions may be identified based on vehicle speed being below a threshold value and/or based on a release of pedal 72 by the vehicle operator, for example.

If catalyst temperature is less than $T_{CAT}$, idle speed mode 1 is selected at 316. Mode 1 may operate with a nominal spark timing retarded from peak torque timing sufficient to increase exhaust temperature and more rapidly warm exhaust emission components. As one option, during the catalyst heating period (e.g., in mode 1), heat flow to the engine coolant may be reduced so that additional excess heat is directed to the catalyst.

Further, in mode 1, the spark timing is adjusted about the nominal timing to control idle speed to a desired idle speed. For example, spark timing may be advanced relative to the nominal timing (while still being retarded from peak torque timing) to increase engine output torque and thereby counteract drops in idle speed or to counteract external loads placed on the engine. As another example, spark timing may be further retarded relative to the nominal timing (while still being retarded from peak torque timing) to decrease engine output torque and thereby counteract increases in idle speed or to counteract external loads removed from the engine. Additionally, throttle adjustments may be coordinated with the spark timing retard and adjustments to maintain the spark timing on average around the nominal timing, while also on average maintaining the desired idle speed. Additional details of mode 1 are described in FIG. 5.

If catalyst temperature is at least equal to $T_{CAT}$, it is determined whether additional heat of combustion is to be transferred to engine coolant and/or engine lubricants (e.g., via advancing of spark timing past peak torque timing). In one example, the routine determines whether an ambient temperature is less than a determined threshold $T_{TH}$ or vehicle cabin heating is requested by occupants or automated climate control system, and also whether engine coolant temperature is less than a prescribed threshold $T_C$ at 320.

If so, the routine continues to 322 to determine whether the engine is in a lower engine idle load region. For example, the routine may determine whether engine load (e.g., as determined based on manifold pressure, engine torque, etc.) is less than a threshold. Further, the threshold may be based on engine knock limits such that, under light load conditions, spark timing is also responsive to knock detection. Further still, the magnitude of spark timing advance past peak torque timing may be limited to reduce encountering knock limitations. In an alternate example, the routine may detect a knock threshold.

Figure 6:
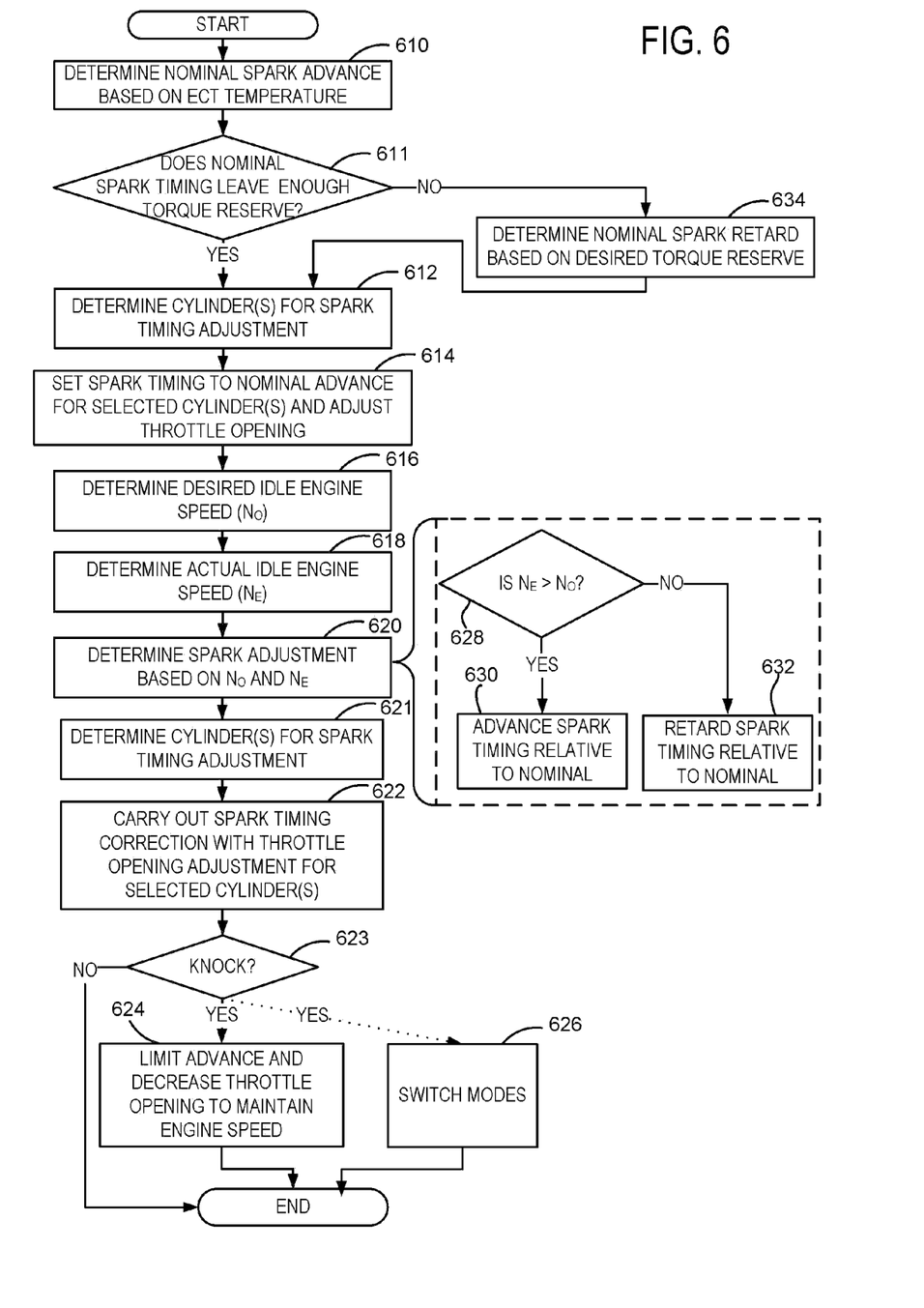

If the answer to 322 is yes, the routine sets the idle speed control mode to idle speed mode 2 at 324, further described in FIG. 6, wherein spark timing will be advanced relative to the peak torque timing. Specifically, in one example, mode 2 may include operation with a nominal spark timing advanced from peak torque timing sufficient to increase heat rejected to engine coolant and/or lubricants to more rapidly decrease engine friction, provide cabin heating, reduce exhaust heat flow, etc. Further, in mode 2, the spark timing is adjusted about the nominal timing to control idle speed to a desired idle speed. For example, spark timing may be retarded relative to the nominal timing (while still being advanced from peak torque timing) to increase engine output torque and thereby counteract drops in idle speed or to counteract external loads placed on the engine. As another example, spark timing may be further advanced relative to the nominal timing (while still being advanced from peak torque timing) to decrease engine output torque and thereby counteract increases in idle speed or to counteract external loads removed from the engine. Additionally, throttle adjustments may be coordinated with the spark timing advance and adjustments to maintain the spark timing on average around the nominal timing, while also on average maintaining the desired idle speed.

If engine load is greater than the predetermined threshold 322, or the answer to 320 is no, the routine sets the idle speed control mode to idle speed mode 3 at 326. In one example, even when increased heating of the engine may be advantageous (e.g., to increase cabin heating), if such operation may result in engine knock or degraded idle speed control (due to insufficient torque reserve as limited by knock), the routine selects mode 3 to maintain sufficient idle speed control. In this way, knock limits may be taken into account and reduced. Further, when engine heating is completed, the routine may also select mode 3 to provide more fuel efficient idling with reduced exhaust or engine heating.

If the engine is not in idle 312, a nominal spark retard is determined and carried out 318.

In this way, the routine can select among the various idle modes to provide improved performance under a variety of conditions.

The above example modes may also have various alternative implementations. In one example, all cylinders of the engine may be operated about a nominal timing as set by the various modes. For example, in mode 2, each cylinder may be operated about the same nominally advanced spark timing, with each cylinder's spark timing being adjusted responsive to the current desired and actual engine speed according to a control routine, such as a PID controller as described herein below. However, in another example of operation in mode 2, some cylinders may have a first nominal spark advance, and other cylinders may have a second nominal spark advance greater (e.g., more advanced) than the first nominal spark advance. In this case, spark timing may be adjusted responsive to differences in the desired and actual speed for only the cylinders with the second nominal spark advance, whereas the cylinders with the first nominal spark advance may be independent of the idle speed control feedback. Alternatively, even in the case where the cylinders have a different nominal spark advance, all of the cylinders may be adjusted responsive to idle speed control feedback. In one particular example, the second nominal spark advance may be set to a substantially advanced spark timing such that combustion torque is substantially reduced such that significant heat can be delivered to the engine coolant and/or lubricating system from those cylinders. Thus, in another example, some cylinder(s) may have different nominally advanced spark timing and, to modulate engine torque, some cylinder(s) may further advance relative to the nominal spark timing thereby reducing engine torque and other cylinder(s) may retard relative to the nominal spark timing thereby increasing engine torque (while all cylinders are still advanced relative to MBT).

Likewise, similar modifications can be used in modes 1 and/or 3. For spark timing adjustments in modes 1 or 3, for example, all cylinders may undergo the same nominal spark timing retard. Alternatively, all cylinders may be retarded relative to peak torque timing but all cylinders do not have the same spark timing. Still, the spark timings of each or a subset of cylinders can be advanced or retarded independently to maintain idle speed. In one example, all cylinders may have the same nominally retarded spark timing and each cylinder's spark timing can retard or advance to modulate engine torque. For example, all cylinders may retard or advance similarly (e.g., with a common magnitude of change). In another example, some cylinder(s) may have different nominally retarded spark timing and, to modulate engine torque, some cylinder(s) may further retard relative to the nominal spark timing thereby reducing engine torque and other cylinder(s) may advance relative to the nominal spark timing thereby increasing engine torque (while all cylinders are still retarded relative to MBT).

In an alternative embodiment, from a cold start, a portion (e.g., half) of the cylinders may be retarded with respect to MBT and another portion (e.g., half) of the cylinders may be advanced or over-advanced with respect to MBT to concurrently increase exhaust heat and engine coolant temperature to provide heat more quickly to the cabin while still increasing catalyst temperature. In this case, to maintain idle engine speed for example, the nominally retarded cylinders may further retard to decrease engine torque and advance to increase engine torque. Further, the nominally advanced cylinders may further retard (while remaining advanced relative to MBT) to increase engine torque and may advance to decrease engine torque. In this case with half of the cylinders retarded with respect to MBT and half of the cylinders advanced with respect to MBT, to maintain idle engine speed, for example in response to a drop in idle engine speed, the nominally retarded cylinders may advance (while remaining retarded relative to MBT) to increase engine speed and the nominally advanced cylinders may retard (while remaining advanced relative to MBT) to increase engine speed. Additionally, the engine may operate with some cylinders advanced and some retarded during transitions between the various modes described herein, such as the first, second, and/or third modes.

Further, less than all of the cylinder(s) may be selected for spark timing adjustment to modulate engine torque while other cylinder(s) may not modulate engine torque. In one example, half of the cylinders may have spark timing at MBT and half of the cylinders may be nominally retarded. Thus, the idle engine speed responsive cylinders can be advanced to increase engine torque or retarded to decrease engine torque (while remaining retarded relative to MBT).

Figure 4:
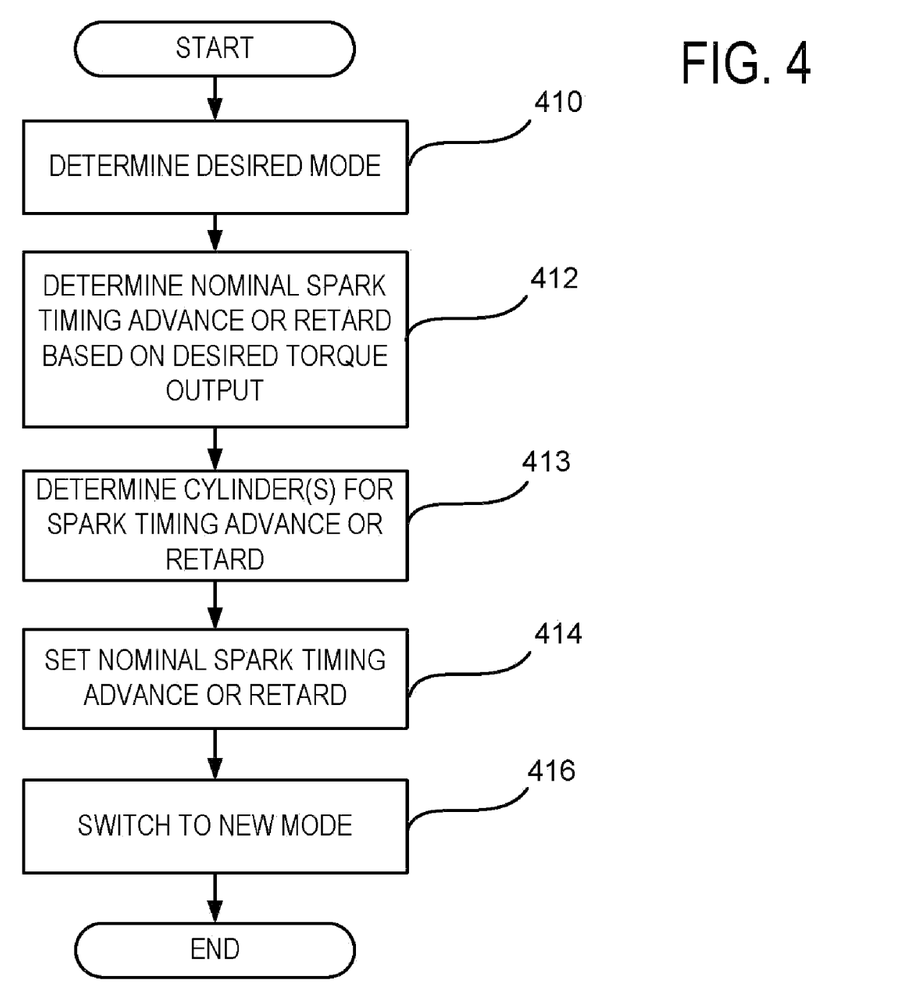
FIG. 4 is a flowchart for controlling transitions between different idle speed control modes.

It should be appreciated that still further idle speed control modes may be used, if desired. In the event that the routine selects a mode that is different than a current operating mode, the engine may transition between the idle speed control modes. FIG. 4 illustrates example control for various idle speed mode transitions, once a mode transition has been identified.

Specifically, at 410, the routine determines the desired mode as described with regard to FIG. 3. Then, at 412, the routine determines a nominal spark timing advance or retard based on operating parameters, including the engine torque produced by the current spark timing. For example, if the engine is in mode 1 (retarded spark timing relative to MBT) and is producing a torque TQ and the desired mode is mode 2, the advanced spark timing relative to MBT that produces TQ is determined as the new nominal spark timing so that engine torque output is maintained substantially constant while transitioning the spark timing from the retarded to advanced timing. In one example, the routine may transition a cylinder from the retarded to advanced timing in one cylinder event.

Next, the cylinder(s) to receive the nominal spark timing advance or retard in the new mode are determined at 413, based on, for example, desired time to catalyst light-off or $T_C$, engine speed, engine load, engine temperature, etc. As noted above, various cylinders may be operated with different relative spark timings.

The nominal spark timing is set in the determined cylinder (s) at 414 and the transition to the new mode is executed at 416. As noted above, the cylinders may be transitioned in a single engine cycle from, for example, a retarded timing relative to peak torque timing to an advanced timing relative to peak torque timing. However, by selecting the spark timing advance at a level producing the same torque as previously produced with retarded timing, a smooth transition may be achieved. Then, if the desired nominal spark advance is different from the advance that produces constant or the desired torque, the routine may further gradually adjust spark timing to the desired nominal value while adjusting throttle to counteract any torque disturbance.

Figure 7:
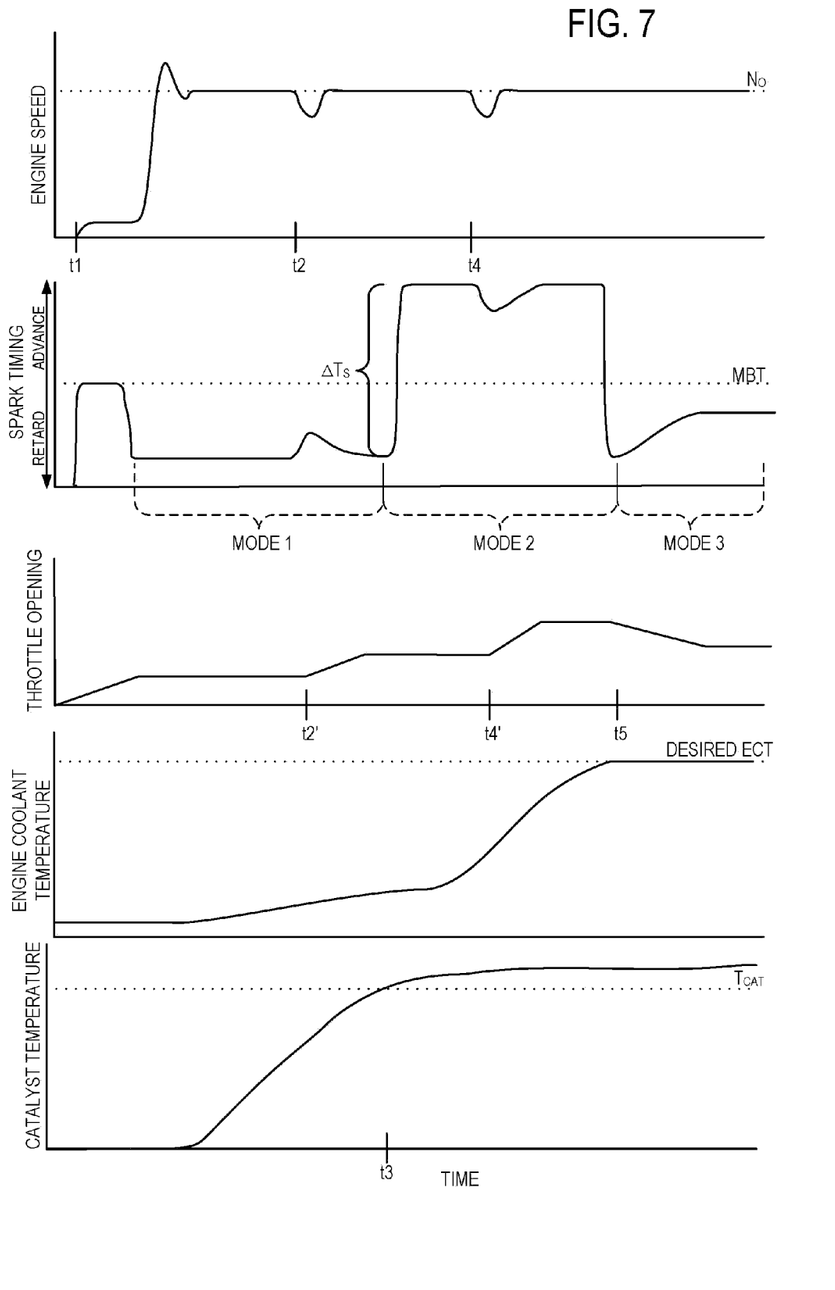
FIG. 7 is a chart demonstrating example operation under various conditions according to one example embodiment.

Various example mode transitions and throttle coordination are described with regard to FIG. 7, for example.

Figure 5:
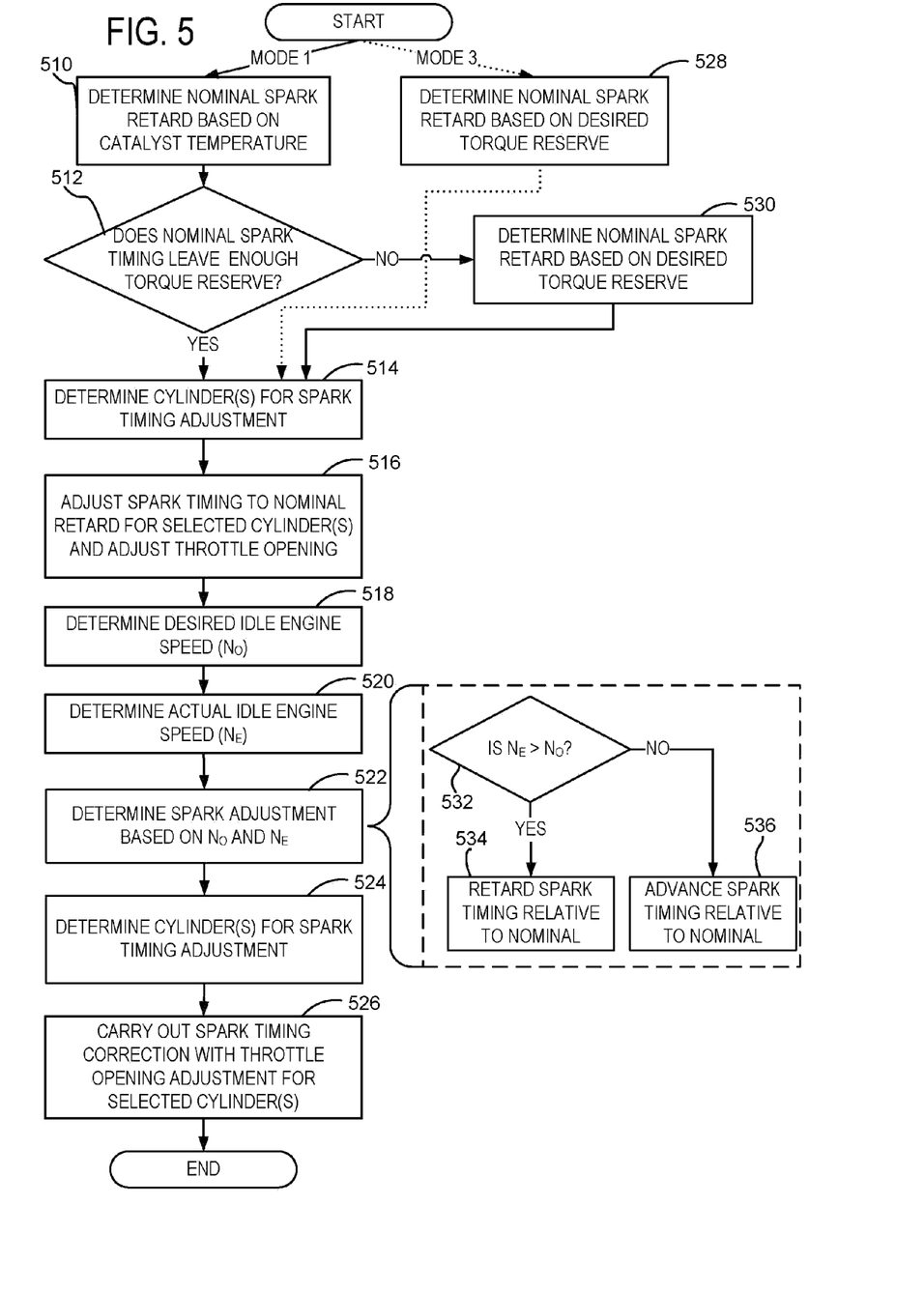
FIGS. 5-6 are flowcharts for engine idle speed control for various idle speed control modes.

Referring now to FIG. 5, it illustrates example control for idle speed modes 1 and 3. First, if mode 1 is determined as the desired mode, a nominal spark retard based on the catalyst temperature is determined at 510. For example, if the nominal spark retard based on a desired torque output at 412 is greater than the nominal spark retard based on catalyst temperature from 510, the spark timing adjustment may include an advance relative to the timing selected in 412 to achieve the nominal spark timing 510. If the nominal spark timing provides sufficient torque reserve as determined at 512, the routine then determines at 514 the cylinder(s), that will undergo spark timing adjustment. In one example, one cylinder may undergo the spark timing adjustment prior to another cylinder undergoing the spark timing adjustment to smooth the transition in torque output. Further, in one example, the nominal spark advance is gradually achieved together with a reduction of airflow via throttle opening, so that an abrupt change in engine torque does not occur. An example of such operation is described further with regard to FIG. 7.

Returning to FIG. 5, when the nominal spark timing is achieved, desired idle engine speed $N_O$ and actual idle engine speed $N_E$ are determined and the spark timing adjustment based on these values is determined at 522. The desired idle speed may be in a range of approximately 500-1300 RPM in one example. Further, in one example, a proportional-integral controller may adjust spark timing responsive to the difference between the desired idle speed and the actual engine speed. Further, throttle adjustments may also be coordinated to further control idle speed, while also maintaining spark timing on average at the desired nominal value. Further, a feedback gain of the spark timing adjustment may be adjusted according to the number of cylinders undergoing the adjustment, with a higher gain (for greater adjustment) selected when fewer cylinders have spark timing adjusted to maintain a desired idle speed. However, various other control structures may also be used.

In one example control routine for idle speed modes 1 and 3, spark timing is nominally retarded relative to MBT; thus, if actual engine speed is greater than the desired engine speed as determined at 532, as may occur if a load is removed from the engine, an adjustment in spark timing that further retards the timing relative to the peak torque timing is determined at 534. Alternately, if engine speed is less than the desired speed 532, as may occur if power steering is engaged, for example, a spark timing advance relative to the nominal spark timing is determined at 536.

At 524, the cylinder(s) responsive to the speed error are determined. Selection of the cylinder(s) may be based on, for example, magnitude of spark timing adjustment, engine load, cylinder pressure, etc. One or more cylinders may undergo the spark timing adjustment, such as noted above with regard to the various different implementations of the idle speed control modes. In one example, where spark timing of all of the cylinders is nominally retarded, the timing of each cylinder is adjusted as determined to maintain the desired idle speed. Finally, spark timing corrections are implemented in the selected cylinder(s) along with airflow changes via throttle opening adjustment at 526 to maintain idle speed while also maintaining the desired nominal spark timing. In this way, it is possible to provide desired catalyst heating or sufficient torque reserve, while also accurately controlling idle speed to the desired value.

If the nominal spark retard based on catalyst temperature does not provide sufficient torque reserve 512, a new nominal spark retard, further retarded from peak torque timing, is determined based on the desired torque reserve at 530 and the routine continues then to 514.

If mode 3 is determined to be the desired mode, a nominal spark retard based on the desired torque reserve is determined at 528 and the routine continues to 514.

Referring now to FIG. 6, it illustrates example control for idle speed mode 2 where cabin heating may be requested or in progress. A nominal spark advance based on the engine coolant temperature is determined at 610. For example, if the nominal spark advance based on a desired torque output at 412 is greater than the nominal spark advance based on engine coolant temperature from 610, the spark timing adjustment may include a retard relative to the timing selected in 412 to achieve the nominal spark timing 610 (along with a corresponding throttle adjustment as described herein).

If the nominal spark timing does not provide sufficient torque reserve, a new nominal spark advance based on desired torque reserve is determined at 634. If the nominal spark advance determined at 610 provides sufficient torque reserve as determined at 611, the routine then determines at 612 the cylinder(s) that will undergo spark timing adjustment along with throttle opening adjustment 614. Again, as noted herein, various implementations of the idle speed control modes may be used. In the current example, the nominal spark retard is gradually achieved together with a reduction of airflow via throttle opening, so that an abrupt change in engine torque does not occur. For example, one cylinder may undergo the spark timing adjustment prior to another cylinder undergoing the spark timing adjustment to smooth the transition in torque output.

Further, in some cylinders, the spark advance may be set significantly over-advanced such that substantially no positive torque is produced by those cylinders, and the engine output and speed is maintained by other cylinders (with ignition timing at MBT, retarded from MBT, or advanced from MBT). In another example, all of the cylinders may be alternately over-advanced such that positive torque is still provided to the vehicle while concurrently increasing engine coolant temperature. In still another example, some of the cylinders may be over-advanced while others are advanced but not so overly advanced, such that positive torque is provided to the engine via the advanced, but not-overly-advanced cylinders, while increasing engine coolant temperature. Further, in yet another example with some cylinder having a nominal advance past MBT and some having a nominal retard from MBT, idle speed control can also be achieved with both groups of cylinders, where the advanced cylinders retard spark timing, and the retarded cylinders advanced spark timing, in response to a drop in engine speed. Further, in this example, the advanced cylinders may be overly advanced so that when idle speed is at the desired value, they produce substantially no torque, but when they are retarded toward MBT in response to a speed drop, they produce substantial positive torque to return the engine to its desired idle speed. In examples where some cylinders are advanced relative to MBT and some are retarded relative to MBT, the nominal values for such operation may be selected to balance cylinder torque among both the advanced and retarded cylinders. Finally, various combinations of the above modes may be used. For example, overly advanced timing of at least some cylinders, in combination with some cylinders operating at a nominal spark retard, and some cylinders near MBT, both advancing toward MBT of the retarded cylinders and retard to MBT of the overly advanced cylinders may be used to increase torque in response to a speed drop during idle conditions.

With advanced or over-advanced spark timing, the spark timing advance may be suspended if maximum cylinder pressure and/or engine knock is detected. Thus, in one example, the routine may return to no nominal spark advance, or to operation with nominally retarded timing, such as mode 3, for example.

When the nominal spark timing is achieved, desired idle engine speed $N_O$ and actual idle engine speed $N_E$ are determined and spark timing adjustments based on these values are determined at 620. In one example, a proportional-integral controller may adjust spark timing responsive to the difference between the desired idle speed and the actual engine speed. Further, throttle adjustments may also be coordinated to further control idle speed, while also maintaining spark timing on average at the desired nominal value. Further still, a feedback gain of the spark timing adjustment may be adjusted according to the number of cylinders undergoing the adjustment, with a lower gain (for less adjustment) selected when more cylinders have spark timing adjusted to maintain a desired idle speed. However, various other control structures may also be used.

In one example control routine for idle speed mode 2, spark timing is nominally advanced relative to MBT; thus, if actual engine speed is greater than the desired engine speed as determined at 628, as may occur if a load is removed from the engine, an adjustment in spark timing that further advances the timing relative to MBT is determined at 632. Alternately, if engine speed is less than the desired speed 628, as may occur if power steering is engaged, for example, a spark timing retard relative to the nominal spark timing is determined at 632. Thus, the control of engine torque increase and decrease in mode 2 is directionally opposite to modes 1 and 3.

At 621, the cylinder(s) responsive to the speed error are determined. Selection of the cylinder(s) may be based on, for example, magnitude of spark timing adjustment, engine load, cylinder pressure, etc. One or more cylinders may undergo the spark timing adjustment, such as described above with regard to FIG. 5, for example. In one example, where spark timing of all of the cylinders is nominally advanced, the timing of each cylinder is adjusted as determined to maintain the desired idle speed. Finally, spark timing corrections are implemented in the selected cylinder(s) along with airflow changes via throttle opening adjustment at 622 to maintain idle speed while also maintaining the desired nominal spark timing. In this way, it is possible to provide desired cabin heating while also accurately controlling idle speed to the desired value.

Next, it is determined if cylinder pressure has exceeded some threshold or if there is knocking 623, for example by accelerometers, ionization sensors or combustion pressure sensors in the cylinder(s). If yes, spark timing advance is limited and engine airflow is reduced via throttle opening adjustment 624 to maintain the engine speed. Alternately, the mode may be switched from mode 2 to modes 1 or 3 (or some other mode not described) wherein the spark timing may be retarded relative to MBT.

In the present application, torque balance may be desirable and thus achieved by setting all cylinders to have substantially similar nominal spark timing or to have spark timing set at one of the two ignition settings that produce peak torque (e.g., MinBT and MaxBT in FIG. 2A and FIG. 2B).

A prophetic example of operation during idle operation is described in FIG. 7. Five time diagrams with a common time basis illustrate the spark timing and throttle opening adjustments as a function of engine speed, engine coolant temperature, and catalyst temperature, among other parameters.

A cold start is executed at t1, with the engine cranked and spark timing is held at MBT until the engine runs-up and idle conditions are met. In mode 1, spark timing is nominally retarded relative to MBT until catalyst light-off $T_{CAT}$ is met at t3. Thereafter, there is a switch to mode 2 so that spark timing is nominally advanced a magnitude AT relative to the nominal spark timing to maintain the same engine torque output. Disturbances to the system, apparent at t2 and t4, may be caused, for example, by use of the power steering and are controlled by retarding or advancing spark timing relative to the nominal spark timing dependent on mode, as described previously in FIG. 5 and FIG. 6, respectively. Spark timing is subsequently returned to the nominal spark timing (e.g., t2' and t4') after a disturbance with coordination of adjusting throttle opening and retarding or advancing spark timing dependent on mode. When the desired engine coolant temperature has been reached, a switch to mode 3 occurs, such that spark timing is retarded relative to MBT to a nominal value not necessarily equal to that of mode 1 such that less excess engine heat can be sent to exhaust outtake and improved fuel consumption may be achieved. The vehicle may remain in mode 3 while in idle speed control. However, in some examples, even after a significant duration of engine or vehicle operation, if the vehicle idles for an extended duration in a significantly cooler ambient temperature, increased cabin heating may be requested, especially in vehicles with large cabin volumes with multiple heating regions. In such an example, the system may be operated in mode 2 to provide the desired cabin heating.

Note that in FIG. 7, when there is a switch to mode 2 at t3, the nominal spark advance determined while switching modes is approximately equivalent to the nominal spark advance determined by ECT temperature. In this case, further adjustment to the nominal value is not used, as contrasted with the mode transition at t5.

Note that the example control and estimation routines that are depicted by the above process flows can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle engine having a plurality of cylinders, comprising:
   during engine idling and after an initial catalyst warm-up, advancing spark timing of at least one cylinder to advanced of a peak torque timing, and retarding spark timing from the advanced timing toward the peak torque timing in response to decreased engine speed to maintain idling speed; and
   suspending the spark timing advance in response to engine knock.

2. The method of claim 1 further comprising, during operation with spark timing advanced from the peak torque timing, further advancing spark timing away from the peak torque timing in response to increased engine speed to maintain idling speed.

3. The method of claim 1 further comprising adjusting spark timing about the advanced timing in response to a difference between a desired idle speed and measured engine speed, where spark timing is retarded from the advanced timing to increase engine output torque responsive to the difference, and advanced from the advanced timing to decrease engine output torque responsive to the difference and thereby maintain the desired engine idle speed.

4. The method of claim 3 where the spark timing is set to advanced from the peak torque timing, and further adjusted about the advanced timing, during cabin heating operation.

5. The method of claim 3 where the spark timing is set to advanced from the peak torque timing, and the advanced timing is adjusted, in response to engine coolant temperature.

6. The method of claim 1 where the spark timing is set to a nominal advance timing relative to the peak torque timing, said nominal advance timing responsive to engine coolant temperature, where the spark timing is retarded from the nominal advance timing responsive to idle speed decreasing.

7. A method for controlling a vehicle engine having a plurality of cylinders, comprising:
   during engine idling, advancing spark timing of at least one cylinder to advanced of a peak torque timing, and retarding spark timing of at least one cylinder to retarded from a peak torque timing, the advance and retarded timings balancing cylinder torque among both the advanced and retarded cylinders, and
   retarding spark timing from the advanced timing toward the peak torque timing and advancing spark timing from the retarded timing toward the peak torque timing in response to decreased engine speed to maintain idling speed.

8. The method of claim 7 wherein the at least one cylinder has advanced timing substantially past peak torque timing such that it produces substantially no output torque when at the substantially advanced timing.

9. A method for controlling engine cylinders comprising:
   maintaining a desired idling speed by:
      advancing a first cylinder's spark timing to advanced of a peak torque timing (MBT) while retarding a second cylinder's spark timing to retarded of MBT, the first and second cylinders' torques balanced
      retarding spark timing of the first cylinder's advanced timing toward MBT and advancing spark timing of the second cylinder's retarded timing toward MBT in response to decreased engine speed.

* * * * *